(12) United States Patent
Bengtsson

(10) Patent No.: US 8,005,512 B2
(45) Date of Patent: Aug. 23, 2011

(54) PORTABLE COMMUNICATION DEVICE WITH THREE DIMENSIONAL DISPLAY

(75) Inventor: Henrik Bengtsson, Lund (SE)

(73) Assignee: Sony Ericsson Mobile Communcations AB, Lund (SE)

( * ) Notice: Subject to any disclaimer, the term of this patent is extended or adjusted under 35 U.S.C. 154(b) by 746 days.

(21) Appl. No.: 11/719,661

(22) PCT Filed: Dec. 2, 2005

(86) PCT No.: PCT/EP2005/012899
§ 371 (c)(1),
(2), (4) Date: May 18, 2007

(87) PCT Pub. No.: WO2006/058770
PCT Pub. Date: Jun. 8, 2006

(65) Prior Publication Data
US 2009/0111511 A1   Apr. 30, 2009

Related U.S. Application Data

(60) Provisional application No. 60/634,187, filed on Dec. 8, 2004.

(30) Foreign Application Priority Data

Dec. 2, 2004  (EP) .................................. 04028550

(51) Int. Cl.
*H04M 1/00* (2006.01)
*G06F 3/14* (2006.01)
*G06F 17/24* (2006.01)

(52) U.S. Cl. .................. 455/566; 455/556.1; 455/552.1; 715/864; 715/214

(58) Field of Classification Search ............... 455/556.1, 455/566, 550.1, 410, 450
See application file for complete search history.

(56) References Cited

U.S. PATENT DOCUMENTS

| 5,812,954 | A | * | 9/1998 | Henriksson .................. 455/566 |
| 7,268,747 | B2 | * | 9/2007 | Taniguchi et al. ................. 345/6 |
| 2001/0026249 | A1 | | 10/2001 | Bell et al. |
| 2003/0095155 | A1 | * | 5/2003 | Johnson ......................... 345/864 |
| 2003/0122804 | A1 | * | 7/2003 | Yamazaki et al. ............. 345/179 |
| 2004/0102224 | A1 | * | 5/2004 | Lee ................................ 455/566 |
| 2005/0268237 | A1 | * | 12/2005 | Crane et al. .................... 715/732 |
| 2006/0052132 | A1 | * | 3/2006 | Naukkarinen et al. ..... 455/556.1 |

FOREIGN PATENT DOCUMENTS

CN    1488093 A    4/2004
(Continued)

OTHER PUBLICATIONS

International Search Report for PCT/EP2005/012899 dated Feb. 24, 2006.

(Continued)

*Primary Examiner* — Lester Kincaid
*Assistant Examiner* — Yu (Andy) Gu
(74) *Attorney, Agent, or Firm* — Harrity & Harrity, LLP

(57) ABSTRACT

The present invention relates to a portable communication device (10) comprising: a display unit (12) for displaying a multi-dimensional image (13) having at least three dimensions; a multi-dimensional image control unit (15) controlling and providing said image (13) to be displayed in more than one plane (13a, b) depending on a selection of a user; a detector element (16) for detecting a selection of the user.

18 Claims, 2 Drawing Sheets

FOREIGN PATENT DOCUMENTS

| | | |
|---|---|---|
| EP | 1 379 063 A1 | 1/2004 |
| EP | 1 441 541 A2 | 7/2004 |
| EP | 1 441 548 A2 | 7/2004 |
| EP | 1 443 385 A1 | 8/2004 |
| JP | 2003-529794 A | 10/2003 |
| JP | 2004-151513 A | 5/2004 |
| JP | 2004-226856 A | 8/2004 |
| WO | WO 03/036452 A1 | 5/2003 |

OTHER PUBLICATIONS

International Preliminary Examination Report for PCT/EP2005/012899 dated Mar. 16, 2007.

* cited by examiner

PORTABLE COMMUNICATION DEVICE WITH THREE DIMENSIONAL DISPLAY

RELATED APPLICATIONS

This application is the national phase under 35 U.S.C. §371 of PCT International Application No. PCT/EP2005/012899 which has an International filing date of Dec. 2, 2005, which designated the United States of America and which claims priority of European Patent Application Number 04028550.4 filed Dec. 2, 2004, and also claims priority under 35 U.S.C. §119 of U.S. Provisional Application Ser. No. 60/634,187 filed Dec. 8, 2004, which are incorporated by reference herein.

TECHNICAL FIELD OF THE INVENTION

The present invention relates to the field of portable communication devices and more particularly to a portable communication device having a multi-dimensional, at least a dimensional (3D) MMI (man-machine-interface) such as a 3D display.

DESCRIPTION OF RELATED ART

Portable communication devices like cellular phones can provide a stereoscopic MMI, for instance a stereoscopic display, typically a 3D display. This is for instance described in EP-A1-1 379 063, which describes a mobile device for capturing, generating and displaying three-dimensional images using a single camera.

In a few years, 3D displays will probably be common in cellular phones such that a user can see images in three dimensions, which will then probably add features to the phone, in particular as regards improved reality of images. However, there is yet a demand to further benefit from the coming 3D displays, for instance as regards seen from a MMI view.

SUMMARY OF THE INVENTION

The present invention is directed towards solving the problem of providing future portable communication device having 3D displays with new functionality that can benefit from using more dimensions than today's 2D devices.

One object of the present invention is to provide a portable communication device having improved features for the MMI compared to today's possibilities.

Herein, the term "MMI" relates to any man-machine-interface for a portable communication device, and is not necessary limited to a display.

According to a first aspect of the present invention, this object is achieved by a portable communication device comprising:
 a display unit for displaying a multi-dimensional image having at least three dimensions;
 a multi-dimensional image control unit controlling and providing said image to be displayed in more than one plane depending on a selection of a user;
 a detector element for detecting a selection of the user.

A second aspect of the present invention is directed towards a portable communication device including the features of the first aspect, wherein said detector element is a device sensing movements or its position relative an other object.

A third aspect of the present invention is directed towards a portable communication device including the features of the second aspect, wherein said detector element is an accelerometer or a gyro.

A fourth aspect of the present invention is directed towards a portable communication device including the features of the second aspect, wherein said detector element comprises a camera sensing movements by means of movement within a coordination system related thereto.

A fifth aspect of the present invention is directed towards a portable communication device including the features of any one of the previous aspects, wherein said control unit provides said image to be displayed such that the user can see what's behind a first plane in a second plane when said device is tilted.

A sixth aspect of the present invention is directed towards a portable communication device including the features of the fifth aspect, wherein said planes comprise a number of items such as icons, to be displayed stacked onto each other seen from a user's point of view.

A seventh aspect of the present invention is directed towards a portable communication device including the features of the first aspect, wherein said control unit is arranged to be controlled by further enabling elements for avoiding unnecessary activation of the control unit.

An eighth aspect of the present invention is directed towards a portable communication device including the features of the first aspect, wherein it is a cellular phone.

The invention has many advantages. For instance, the device according to the invention will benefit from future 3D MMI:s and in particular 3D displays. A user can see what is behind a first plane of items. For instance icons typically related to user selectable items can be shown not just in one plane of items but in several typically user selectable planes of items.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

A portable communication device according to the present invention will now be described in relation to a cellular phone, which is a preferred variation of the invention. The phone is furthermore described in relation to a so-called stick-type phone, but it can be other types of phones like clamshell phones. The portable communication device can also be another type of device, like a cordless phone, a communication module, a PDA or a lap top computer or any other type of portable device communicating with radio waves.

Figure 1:
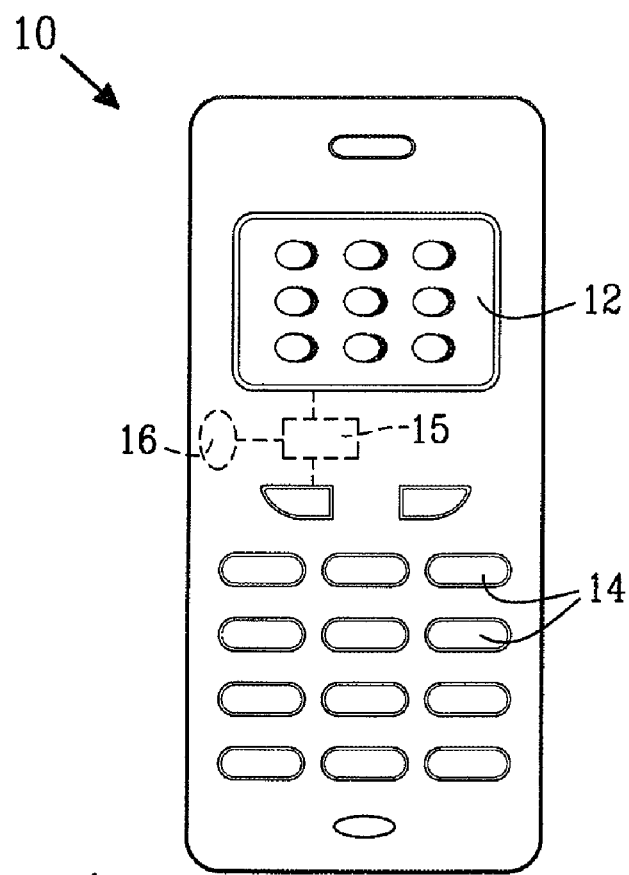
FIG. 1 schematically shows a front view of a portable communication device in the form a cellular phone, having a 3D display, according to an embodiment of the invention, FIG. 2 schematically shows a simplified block schematic of relevant parts of the phone illustrated in FIG. 1.

FIG. 1 schematically shows a front perspective view of a phone 10 according to an embodiment of the present invention. The phone 10 includes a 3D display 12, and a number of keys on a keypad 14 provided below the display 12. In this figure, the 3D display can be any suitable 3D display including enhanced stereoscopic 2D displays having 3D functionality providing a sense of depth in the image shown. Thus, also a 2D display including polarization glasses or the like to provide a 3D functionality is possible without departing from the scope of the invention. Since such technology and other 3D image conversion techniques are well known for a person skilled in the art, a more detailed description thereof will not be given herein.

Figure 2:
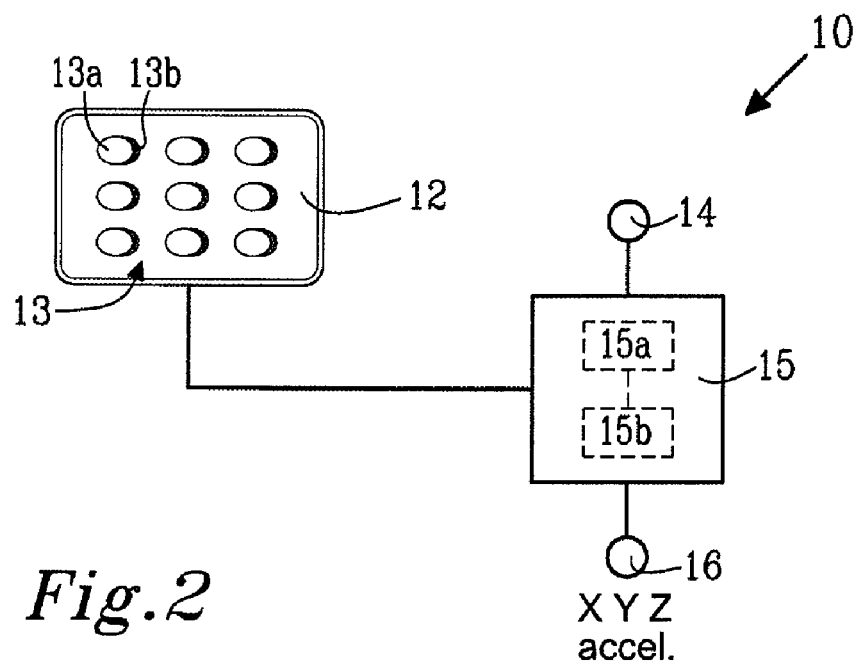

Now is referred to FIG. 2 which schematically shows a simplified block schematic of the interior of the phone illustrated in FIG. 1. FIG. 2 schematically shows a view of the parts of the interior of the phone that are relevant to the present invention according to the present embodiment. Thus, conventional parts such as signal processing parts and the like not directly related to the invention have been omitted in the drawings figures for a better understanding of the invention, since these parts and the function thereof are considered to be well-known for a person skilled in the art of portable communication devices such as cellular phones.

In this embodiment, the phone 10 includes a display unit 12 for displaying a multi-dimensional image 13 having at least three dimensions. The display unit 12 typically is a liquid crystal 3D display known per se. See for instance EP-A1-1 379 063.

Furthermore, the phone 10 includes a 3D image control unit 15 controlling and providing the image 13, or more precisely planes 13a-b comprising items, of which only a first plane 13a containing items such as icons are shown, to be displayed in more than one plane stacked onto each other seen from a user's point of view, depending on a selection of a user of the phone 10, and a detector element 16 for detecting the selection of the user. By means of the detector element 16 (or any other user selection element such as conventional user operated keys), the user can select the image (or more precisely, the planes 13a-b containing the items, i. e. the icons) to be displayed such that also the second plane of items 13b also can be displayed, for instance by tilting (i. e. the movement or the position of the phone is sensed) the phone to a certain degree or select also the second plane 13b to be displayed located behind the first plane 13a.

The image control unit 15 typically comprises a processor 15a executing a program to control the image 13, and a memory 15b referenced by the processor 15a. The processor can be a special processor, or a processor such as a microprocessor that is used for other purposes in the phone. Preferably, the processor performs time integration of the acceleration measurements to obtain velocity measurements of the phone, and also time integration of the velocity measurements to obtain measurements of the position of the phone at any desired time. These integration functions can alternatively be performed by a dedicated processor connected to the accelerometer rather than the processor 15a. The detector element 16 preferably is an accelerometer, but any other device suitable for sensing movements (tilting) of the phone 10 can be provided. For instance, a camera (typically a conventional digital camera module with suitable software provided in the phone) can be employed as detector element 16 using a co-ordinate system without departing from the invention. As such it is not necessary to provide an additional camera but the camera used in a conventional phone can be used. This is not described in more detail since it is well-known for a person skilled in the art to implement.

It is also possible that the detector element is substituted by the keyboard 14, wherein the image control unit 15 receives an input from the user by means of the keyboard in a way known per se, possibly also including input by means of a image rotating-key or any other suitable key or cursor arranged to operate the image control unit 15 according to the user's preference.

Moreover, the control unit 15 can be arranged to be controlled by further enabling elements for avoiding unnecessary activation of the control unit 15 (not shown).

Figure 3A:
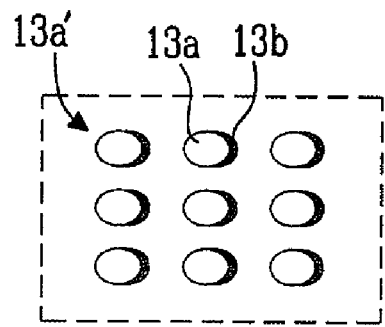
FIG. 3a shows the display of the portable communication device shown in FIG. 1 in more detail, wherein one plane of icons is shown as a 3D image.
Figure 3B:
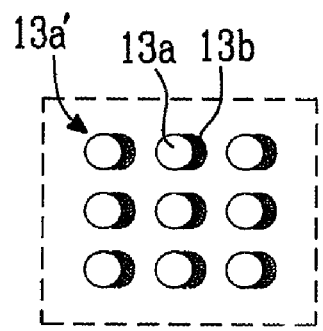
FIG. 3b shows the same display as in FIG. 2a but when a user has tilted the cellular phone to the right, wherein a second plane of icons starts to appear.
Figure 3C:
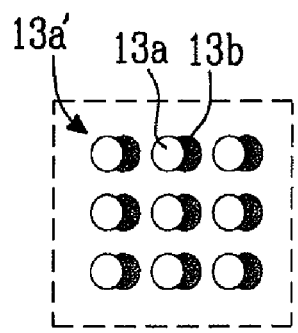
FIG. 3c shows the same display as in FIGS. 2a and b, but even more tilted to the right, wherein the second plane appears clearly.

Now is referred to FIG. 3a-c, which show the display of the portable communication device shown in FIG. 1 in more detail, wherein one plane of icons is shown as a 3D image, FIG. 3b shows the same display as in FIG. 3a but when a user has tilted the cellular phone to the right, wherein a second plane of icons starts to appear, FIG. 3c shows the same display as in FIGS. 3a and b, but even more tilted to the right, wherein the second plane appears clearly.

In FIG. 3a, a user (not shown) that looks at the display 12 sees a first plane 13a containing first items 13a40 such as icons arranged in the first plane. The items 13a' can for instance represent messages, media player, video call, settings etc and are shown as 3D images. In this mode, from the user's point of view seen at essentially, the user cannot see what is hidden behind this first plane of icons.

In FIG. 3b the user (or any other person of course) has tilted the phone to the right, which is detected by the detector 16, herein an accelerometer. A different view of the MMI then appears such that the user can see what is behind the first plane 13a (shown in FIG. 3a). In FIG. 3b it is evident that new icons 13b' start to appear.

In FIG. 3c the user has tilted the phone even more to the right and the second plane 13b of icons gets more and more visible.

Figure 4:
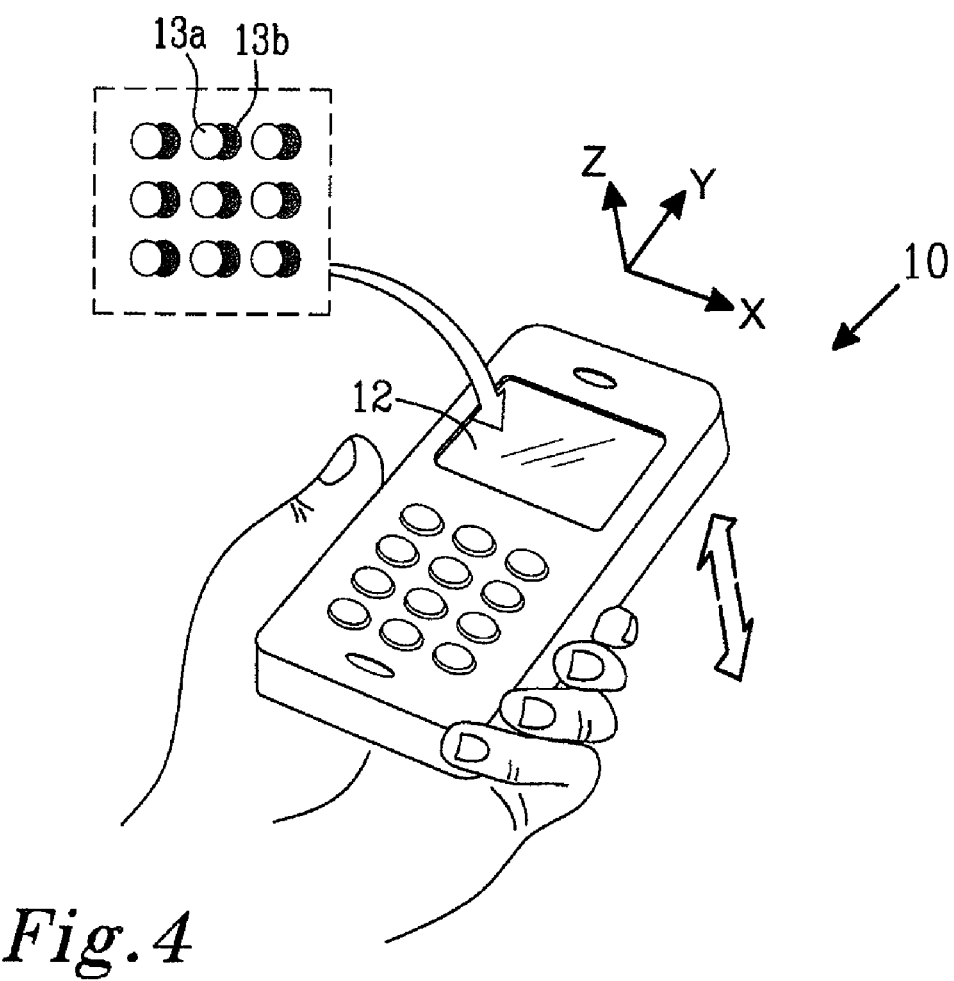
FIG. 4 shows the phone illustrated in FIG. 1 held in a user's hand.

In FIG. 4 it is further illustrated in even more detail how movement of a phone 10 is used to control the above described functions of the phone. FIG. 4 clearly shows how a user's hand can be tilted (illustrated by means of two arrows) to practice the invention. FIG. 4 shows a slightly tilted position to the right of the display 14 wherein the two planes 13a and 13b appears clearly distinguished (corresponding to the situation illustrated in FIG. 3c).

According to the described embodiment of the invention, by having some detector device that can sense movements the user will be able to tilt the phone to see from the side, and also see behind the first plane 13a, which will provide good use of a 3D display.

In this way much information can easily be provided in a small display area by means of showing information according to a user's preference. Contrary to a more conventional way of simply using selectable information by means of a menu system more information can be displayed at the same time also on a small area. This is often the case since at least in today's and near future phones, the display area is often small compared to other portable or stationary devices such as lap tops and PCs. Thus, the invention finds particularly application in phones or other devices having small display area.

Moreover, the invention solves the problem with space required for locating multiple keys, and the use of multiple keys that may be confusing and difficult to practice by means of the inventive convenient control of the MMI.

The portable communication device according to the present invention can be varied in a number of ways apart from what has been disclosed above.

The invention claimed is:

1. A portable communication device comprising:
    a display unit to display a first image in a first plane and a second image in a second plane, where the first image comprises a number of first user-selectable icons and the second image comprises a number of second user-selectable icons, each user-selectable icon representing a particular functionality to be performed by the portable communication device when selected by a user of the portable communication device, where, when the portable device is substantially not tilted relative to the user, the first user-selectable icons appear in front of the second user-selectable icons, wherein, when the portable communication device is substantially not tilted relative to the user, the second user-selectable icons are completely hidden by the first user-selectable icons;
    a control unit to control and provide said first and second images to be displayed in said first plane and said second plane, respectively, such that the second user-selectable icons become at least partially visible out from behind the first user-selectable icons when said portable communication device is tilted relative to the user; and
    a detector element to detect the tilting of the portable communication device.

2. The portable communication device according to claim 1, wherein said detector element is a device sensing movements or its position relative another object.

3. The portable communication device according to claim 2, wherein said detector element is an accelerometer or a gyro.

4. The portable communication device according to claim 2, wherein said detector element comprises a camera sensing movements by means of movement within a co-ordination system related thereto.

5. The portable communication device according to claim 1, wherein said control unit is arranged to be controlled by further enabling elements for avoiding unnecessary activation of the control unit.

6. The portable communication device according to claim 1, wherein the portable communication device is a mobile phone.

7. The portable communication device according to claim 2, wherein said control unit is arranged to be controlled by further enabling elements for avoiding unnecessary activation of the control unit.

8. The portable communication device according to claim 3, wherein said control unit is arranged to be controlled by further enabling elements for avoiding unnecessary activation of the control unit.

9. The portable communication device according to claim 4, wherein said control unit is arranged to be controlled by further enabling elements for avoiding unnecessary activation of the control unit.

10. The portable communication device according to claim 2, wherein the portable communication device is a mobile phone.

11. The portable communication device according to claim 3, wherein the portable communication device is a mobile phone.

12. The portable communication device according to claim 4, wherein the portable communication device is a mobile phone.

13. The portable communication device according to claim 5, wherein the portable communication device is a mobile phone.

14. The portable communication device according to claim 1, where a visible area, of each of the second user-selectable icons, corresponds to an amount of the tilting of the portable communication device.

15. The portable communication device of claim 1, wherein the second user-selectable icons do not become at least partially visible out from behind the first user-selectable icons until said portable communication device is tilted by a particular amount relative to the user.

16. A method, performed in a portable communication device, comprising:
    displaying, by a display unit of the portable communication device, a first image in a first plane and a second image in a second plane, where the first image comprises a number of first user-selectable icons and the second image comprises a number of second user-selectable icons, each user-selectable icon representing a particular functionality to be performed by the portable communication device when selected by a user of the portable communication device, where, when the portable communication device is substantially not tilted relative to the user, the first user-selectable icons are positioned in front of the second user-selectable icons, completely hiding the second user-selectable icons behind the first user-selectable icons when the portable communication device is substantially not tilted relative to the user;
    providing, by a control unit of the portable communication device, said first and second images to be displayed in said first plane and said second plane, respectively, such that the second user-selectable icons become at least partially visible out from behind the first user-selectable icons when said portable communication device is tilted relative to the user; and
    detecting, by a detector element of the portable communication device, the tilting of the portable communication device.

17. The method of claim 16, further comprising:
    controlling a visible area, of each of the second user-selectable icons, based on an amount of the tilting of the portable communication device relative to the user.

18. The method of claim 16, further comprising:
    maintaining the second user-selectable icons completely hidden behind the first user-selectable icons until the portable communication device is tilted by a particular amount relative to the user.

* * * * *